United States Patent [19]

King

[11] 3,964,174

[45] June 22, 1976

[54] CONTROLLED HUMIDITY FREEZE DRYING PROCESS

[75] Inventor: Cary J. King, Kensington, Calif.

[73] Assignee: The Regents of the University of California, Berkeley, Calif.

[22] Filed: June 6, 1975

[21] Appl. No.: 584,597

[52] U.S. Cl. .................................................. 34/5
[51] Int. Cl.$^2$ .......................................... F26B 5/06
[58] Field of Search ................................... 34/5, 92

[56] References Cited
UNITED STATES PATENTS

| | | | |
|---|---|---|---|
| 3,438,792 | 5/1969 | Kruger | 34/5 |
| 3,466,756 | 9/1969 | Tooby | 34/5 |
| 3,716,382 | 2/1973 | Chandrasekaran et al. | 34/5 |

Primary Examiner—John J. Camby
Attorney, Agent, or Firm—Phillips, Moore, Weissenberger Lempio & Strabala

[57] ABSTRACT

Freeze drying of foods is carried out under controlled humidity conditions whereby the dried products retain moisture in the 5–25% range and are thereby rendered suitable for compression. Humidity in the drying chamber is controlled by the presence of suitable hydrating inorganic salts that pass from a first low hydrated state to higher hydrated states during the drying process. During the hydration transition, the salts regulate the relative humidity in the drying chamber and further may furnish thermal energy for transmission to the drying foods and sublimation of moisture therefrom at reduced atmospheric pressure.

9 Claims, No Drawings

CONTROLLED HUMIDITY FREEZE DRYING PROCESS

BACKGROUND OF THE INVENTION

In the conventional and well-known freeze drying process, various types of food such as meats, including beef and poultry, vegetables and fruits are prepared, usually as a cooked product, and immediately thereafter cooled into the frozen state. The frozen food product is subsequently loaded into specially designed vacuum chambers wherein the moisture, which is for the most part in the form of ice crystals in the food, is sublimed from the product, usually under reduced pressure and removed to produce a dried (1–3% moisture) product that is subsequently packed in hermetically sealed containers and stored for use at a later time. The freeze dried food product may be prepared for consumption by the addition of water to effectively restore the moisture and produce a food that very closely approximates the original with respect to appearance, flavor, texture and nutritional quality.

However, during the freeze drying process, the food product retains a major portion of its original volume, even though the weight is greatly reduced due to the removal of water. In addition, the water removal leaves a tissue "skeleton" that tends to be quite fragile and brittle. Any attempts to reduce the volume of the freeze dried product result in destruction of the tissue "skeleton" and the creation of a powdered or fragmented product, which, upon reconstitution with water, produces a "mush" that has no physical resemblance at all to the original food product and is therefore aesthetically undesirable. In addition, the extensive porosity of the tissue skeleton allow permeation by oxidizing gases that may enter the package and thereby degrade the quality of the freeze dried product.

On the other hand, reduction of the volume of the freeze dried product is quite desirable from a shipping and storage standpoint; further, any compaction thereof tends to reduce the vulnerability of the "skeleton" to destruction during handling when transported and stored or during the reconstitution process; and, as is readily apparent, compaction reduces the tissue porosity, thus reducing vulnerability to oxidation deterioration.

Previous attempts have been made to produce a freeze dried product that is capable of being compressed into a smaller volume without destruction of the tissue "skeleton" or interference with subsequent reconstitution into an edible product. In this regard it has been discovered that if almost any food product is freeze dried in a "limited" manner so as to leave behind a moisture content in the range of 5–25%, such a limited freeze dried product may be compressed to perhaps one half to one third or less of its original volume without crumbling or powdering, or appreciable harm to the tissue structures.

The compressed, limited freeze dried product is usually subsequently further dried to reduce the moisture content thereof to the usual 1–3%, after which the compressed freeze dried product is packaged and stored in the customary manner. Such products, upon reconstitution, regain most of their original volume and appearance and for all intents and purposes are comparable with uncompressed freeze dried products.

The production of a satisfactory "limited" freeze dried product by conventional freeze drying techniques is extremely difficult due to the manner in which such conventional processes are carried out. In the conventional freeze drying process, frozen food in the form of relatively small pieces is introduced into a vacuum chamber with facilities for supplying heat to the food pieces to compensate for the endothermic expenditure of thermal energy that takes place during the sublimation of the ice crystals. This heat expenditure, if uncompensated, would result in the reduction of the temperature of the food pieces and thereby diminish the ability to sublime the ice crystals into water vapor. In any event, the food pieces after being sealed into the chamber are supplied with the necessary thermal energy to effectuate sublimation of the ice crystals into vapor, and, at the same time, the atmosphere surrounding the food pieces is reduced in pressure so that sublimation may take place and the water vapor is removed and condensed elsewhere in the system.

At the beginning of the process, the food piece is completely permeated throughout its entire mass with ice crystals which form the major portion by weight of the food. As drying progresses, the ice crystals nearest the food surface sublime, and pass into the vapor phase and are transferred into the drier, very pressure atmosphere surrounding the food particle. As drying continues, the "ice front" retreats further and further into the food piece away from the surface thereof, until eventually the ice crystals in the very center of the food sublime, pass through the surrounding layers of relatively dry food tissue, and from thence into the surrounding dry, low pressure atmosphere.

As will be seen from the above discussion, during the conventional freeze drying process at a time intermediate the completion thereof, the food piece consists of a relatively dry outer layer surrounding an inner frozen core that is as moist as the original food product. It can be seen that if the goal of the freeze drying process is to leave a substantial and uniform moisture content after the freeze drying is completed, the goal is difficult to attain by the fact that the production of a higher moisture content product must of necessity be achieved by stopping the ordinary freeze drying process while a portion of the icecore still remains in the food particle. Such a product, although it has an average moisture content in the desired range, will in fact have a small but very wet and unstable core portion with the outer regions thereof being too dry to behave satisfactorily upon compression. The wet core has never been "freeze dried" while the outer portions have been freeze dried far beyond the desired residual moisture range. Therefore, the approach of partially freeze drying a product by conventional means to achieve a higher moisture end product have been unsuccessful in achieving a desirable product.

In order to avoid the difficulty noted above, it has been proposed to completely freeze dry the food product and then "rewet" the dry product up to the desired moisture level. Such "rewetting" has been attempted by subjecting the dry product to a fine water spray or a steam soaking. However such attempts have met with little success because it is difficult to equally contact all surfaces of the food with the moisture; and, or importantly, the outer food tissues tend to become excessively wet while the core stays dry even though the food is permitted to "equilibrate."

BRIEF DESCRIPTION OF THE INVENTION

The present invention provides a process for producing a limited freeze dried product, wherein the moisture content thereof is considerably higher than the moisture content of a fully freeze dried conventional product, and further wherein the moisture content of the product is uniform throughout the body thereof and from piece to piece.

In the process of the present invention, freeze drying is carried out in an environment such that the relative humidity at the food surface and within the food particle does not fall below a predetermined value that is high enough to insure that the moisture content in any region of the food product will not drop below the prescribed value during the drying process. More specifically, in the present invention process, freeze drying is carried out while maintaining the atmosphere at a relatively high humidity. The humidity is maintained and controlled by the presence of hydrating salts in the drying chamber, which salts undergo transition from one hydrated state to a higher hydrated state during the drying procedure. So long as sufficient salt is present in the lower hydrated state, the relative humidity within the drying chamber will be maintained at a constant figure determined by the transition vapor pressure that is the characteristic of the particular hydrated salt utilized.

The presence of such hydrated drying salts automatically regulates the relative humidity within the drying chamber, and thereby controls the residual moisture content of the food product being dried therein.

It is therefore an object of the present invention to provide a process for freeze drying food products to a relatively high residual moisture content, i.e., in the range of from about 5–25% by weight.

It is another object of the invention to freeze dry food products to a uniform predetermined moisture content that is especially suitable for subsequent compression.

It is another object of the invention to utilize hydrated salts passing from one hydration state to a higher hydration state for the purpose of regulating the relative humidity within a freeze drying chamber.

It is yet another object of the present invention to provide a method for "humidistatting" a freeze drying process to produce a uniform residual moisture content in a freeze dried food product.

Other advantages and applications of the present invention will become apparent from a review of the following description and the claims appended hereto.

DETAILED DESCRIPTION OF THE INVENTION

The present invention provides a self-regulating control for the environmental relative humidity during the limited freeze drying of food products. This control is provided by freeze drying the food products in the presence of hydrating salts that provide a fixed equilibrium partial pressure of water vapor at a given temperature, no matter what the extent of conversion from a first lower hydration state to a second higher hydration state. The hydrating reaction utilized in the present process is as follows:

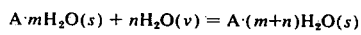

$$A \cdot mH_2O(s) + nH_2O(v) = A \cdot (m+n)H_2O(s)$$

wherein A is the hydrating salt, (s) denotes a solid and (v) denotes vapor. The fixed equilibrium partial pressure of the water vapor at a given temperature exhibited by the hydrating salts follows from the equilibrium constant of the reaction since the reaction combines a solid with a vapor to form another solid, whereby the equilibrium constant $(K_p) = p^n{}_{H_2O}$. Furthermore, for most salt hydrate formation reactions the trend of the reaction equilibrium constant with temperature is such that the equilibrium relative humidity maintained during a particular hydrate transition is only weakly dependent upon temperature. Thus for the reaction:

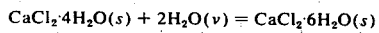

$$CaCl_2 \cdot 4H_2O(s) + 2H_2O(v) = CaCl_2 \cdot 6H_2O(s)$$

the equilibrium relative humidity is about 22% for a wide range of temperatures in the neighborhood of ambient temperature.

Prior studies have shown that different types of food products require different amounts of residual moisture in order to undergo compression without destroying the desirable tissue structures and keeping qualities thereof. These desirable residual moisture levels must be determined empirically. However, as an illustration of the general levels found to be necessary, the following list of several food products is presented:

TABLE I

| Food | Percent of Water by Weight in Limited Freeze Dried Product |
|---|---|
| cooked beef | 8–14 (11 optimum) |
| cooked peas | 12 |
| cooked shrimp | 9 |
| canned tuna | 12–17 |
| cooked chicken | 10–15 |

In order to dry the food products to the desired level of residual moisture, the drying is conducted, most usually, under reduced atmospheric pressures, with the relative humidity in the atmosphere being maintained by hydrated salts undergoing hydration reactions such as noted above.

A large number of salts are useful for this purpose with the principal criteria for their selection being the relative humidity maintained by a particular hydration transition; the water capacity of the transition; the nontoxicity of the salt; ease of regeneration, e.e., ease of removing water molecules from the higher hydrates to regenerate the lower hydrates; economic cost or availablility; and the like.

The following is a list of a few preferred salts meeting the criteria noted above and which maintain relative humidities over wide ranges:

TABLE II

| Hydrate | transition (Nos. of H$_2$O) | Density(gm/cc) | gm.H$_2$O/ cc hydrate | Relative Humidity |
|---|---|---|---|---|
| MgSO$_4$ | (7–12) | 1.68 | 0.61 | 93% at 20°C |
| Na$_2$CO$_3$ | (7–10) | 1.51 | 0.35 | 69% at 20°C |
| MgSO$_4$ | (6–7) | Approx 1.7 | Approx 0.1 | 48–51% at 25°C |
| MgSO$_4$ | (5–6) | Approx 1.8 | Approx 0.15 | 41–43% at 25°C |
| Mg(NO$_3$)$_2$ | (4–6) | Approx 1.8 | Approx 0.3 | 36% at 30°C |
| CaSO$_4$ | (½–2) | Approx 2.4 | Approx 0.45 | 35% at 20°C |
| MgSO$_4$ | (4–5) | Approx 1.9 | Approx 0.2 | 33–37% at 25°C |

TABLE II-continued

| Hydrate | transition (Nos. of H$_2$O) | Density(gm/cc) | gm.H$_2$O/ cc hydrate | Relative Humidity |
|---|---|---|---|---|
| SrCl$_2$ | (2–6) | 2.69 | 0.99 | 32–33% at 20°C |
| Al$_2$(SO$_4$)$_3$ | (6–18) | Approx 2. | Approx 1. | 30.3% at 20°C |
| CaCl$_2$ | (4–6) | Approx 1.5 | Approx 0.3 | 21% at 20°C |
| Ca(NO$_3$)$_2$ | (3–4) | Approx 2. | Approx 0.2 | 21% at 20°C |
| MgSO$_4$ | (1–4) | 2.445 | 0.95 | 18–19% at 25° C |
| CaCl$_2$ | (2–4) | 0.835 | 0.20 | 14% at 20°C |
| Ca(NO$_3$)$_2$ | (2–3) | Approx 2. | Approx 0.2 | 13% at 20°C |
| Ca(NO$_3$)$_2$ | (1–2) | Approx 2. | Approx 0.2 | 10% at 20°C |

The above noted salts are only a few of the possibilities and many more hydrates are useful in the invention process.

The relative humidity necessary to yield the desired residual moisture content is dependent upon a number of factors principally related to the water binding mechanisms at play in each particular food. Thus the water binding constants vary in accordance with the chemical makeup of the food product. Carbohydrates retain water with a different tenacity than do proteins. In some types of tissues the water molecules may be integrated in the tissues in the form of solutions, in the case of sugars; or with the water hydrogen bonded, in the case of proteins. In other instances, the water may be merely physically bound into the tissue structures. Thus the required relative humidity necessary to reduce the water content for a particular food product must also be empirically determined. Some work has been undertaken in this regard, and data is available on several food products. For instance, the relative humidity apparently necessary for the limited freeze drying of the foods listed in Table I above is as follows:

TABLE III

| Food | Relative Humidity |
|---|---|
| cooked beef | 22% |
| cooked peas | 40% |
| cooked shrimp | 8% |
| canned tuna | 32–52% |
| cooked chicken | 20–45% |

Possible salts and their related hydration transitions that are capable of establishing the required relative humidity for limited freeze drying of the above illustrated foods are as follows:

TABLE IV

| Food | Salt and hydrate transition |
|---|---|
| cooked beef | CaCl$_2$ . 4H$_2$O → CaCl$_2$ . 6 H$_2$O |
| cooked peas | MgSO$_4$ . 5H$_2$O → MgSO$_4$ . 6 H$_2$O |
| | or CaSO$_4$ . ½ H$_2$O → CaSO$_4$ . H$_2$O |
| cooked shrimp | Ca(NO$_3$)$_2$ . H$_2$O → Ca(NO$_3$)$_2$ . 2 H$_2$O |
| | or CaCl$_2$ . H$_2$O → CaCl$_2$ . 2 H$_2$O |
| canned tuna | MgSO$_4$ . 5H$_2$O → MgSO$_4$ . 6 H$_2$O |
| | or CaSO$_4$ . ½ H$_2$O → CaSO$_4$ . 2 H$_2$O |
| cooked chicken | CaSO$_4$ . ½ H$_2$O → CaSO$_4$ . 2 H$_2$O |
| | or Al$_2$(SO$_4$)$_3$ . 6H$_2$O → Al$_2$(SO$_4$)$_3$ . 18 H$_2$O |

It should be clearly understood that the salts indicated in Table IV above are merely illustrative and that a great number of other salts and hydration transitions are useful in the drying operation.

OPERATION OF THE LIMITED FREEZE DRYING PROCESS

Limited freeze drying utilizing hydrating salts to maintain a desired environmental relative humidity can be carried out in suitable apparatus somewhat similar to that already used in conventional freeze drying. However the apparatus is suitably modified for the special requirements of limited freeze drying with hydrating salts.

Specifically, a vacuum chamber is provided with the necessary vacuum pumps capable of reducing the pressure within the chamber to a moderate vacuum in the range of from about 0.1 to 50 mm. of mercury, absolute pressure. Means must be provided to convey moisture given up by the freeze drying food to the hydrating salts and at the same time convey thermal energy generated by the hydrating salt back to the food. Alternately independent means may be provided to continually supply heat to the food and to remove heat independently continually from the salt hydrate. The drying product requires a thermal energy input in order to sublime the ice crystals therein.

Although a number of ways of implementing this process can be conceived, a particularly advantageous arrangement is a layered-bed vacuum chamber wherein a series of mesh or perforated trays are stacked, one over the other. The trays alternately hold the food product and hydrating salt. The trays are surrounded in the chamber by solid partitions so that circulating, reduced pressure gas in the pressure range 3 to 100 mm Hg (preferably 5–50 mm Hg) is forced vertically through each alternate foodsalt layer in turn. Fan or blower means must be provided for circulation of the gas (most usually air, although other gases can be efficaciously used). Thus the evolving moisture is conveyed to the hydrating salt while the generated heat is conveyed to the freeze drying food.

The gas velocities are not critical, but must be sufficient to ensure as uniform a thermal distribution between salt and food product as possible and a similar uniformity of relative humidity in the chamber. Velocities of about 25 ft/sec and higher have been found adequate for freeze drying beef and turkey meat loadings of 1 lb/sq.ft. wherein the food products were in 1 cm. cubes.

The quantity of hydrating salt necessary to dry a given quantity of food product can be calculated from the grams of water/cc of hydrate taken up in a particular transition (see next to last column in Table II above). the number of grams of water to be removed from a given quantity of food product is calculated and sufficient hydrated salt is charged into the vacuum chamber to furnish the necessary water uptake capacity. In addition, a small excess is added to absolutely ensure that the desired relative humidity is maintained through the end of the freeze drying period.

In some instances a smaller quantity of salt than calculations indicate may be utilized where the salt has a number of hydration transitions. For instance, where the desired final relative humidity corresponds to a higher hydration transition, drying may be started with the salt at two or even three lower hydration states than the ultimate desired state.

As an illustration, in the case of cooked beef, the desired limited freeze dried water content is about 11% (see Table I) and a suitable relative humidity for achieving this water content is 22% (see Table III). Tables II and IV indicate that the 4–6 hydration transition of $CaCl_2$ is suitable for the limited freeze drying of beef. However, it has been found that the water uptake efficiency, or capacity, utilizing the 4 to 6 $CaCl_2$ hydrate transition, can be increased to about 1 lb of initial frozen beef per 1 lb of $CaCl_2$ by starting the limited freeze drying process with $CaCl_2$ monohydrate, rather then the indicated tetrahydrate state. The quantity of $CaCl_2 \cdot H_2O$, initially placed in the vacuum chamber is calculated to result in an average hydration level of just under the hexahydrate, i.e., $CaCl_2 \cdot 5.7H_2O$, at the conclusion of the limited freeze drying process.

Of course, starting with the monohydrate level can reduce the equilibrium relative humidity below the desired final value early in a run. The equilibrium relative humidity may also be affected by the fact that increased heat release and consumption effects may cause the hydrating salt to operate warmer than the surface of the food pieces. However this phenomenon would provide an offsetting effect of increasing the equilibrium relative humidity in the circulating gas. In any event, both the above noted effects are reduced towards the end of the run when the average $CaCl_2$ hydrate achieves the tetrahydrate state and the final 4–6 hydration transition predominates. Ultimately at the end of the freeze drying run, the predetermined relative humidity (about 21 –22%) is reached in a reliable fashion.

The above variation utilizing multiple hydration transitions is noted for the purpose of indicating how smaller quantities of the drying salts could be used more efficiently to achieve limited freeze drying. However such technique may not be available or advisable for all food products or in all instances. In any event, the single desired hydration transition for any selected salt can be utilized in the freeze drying process of the invention.

After loading the food and desired hydrated salt into the vacuum chamber, a seal is effected and the pressure is reduced to the indicated 5–50 mm. Hg. level. The blowers are started and freeze drying commences and is continued until the ice is completely sublimed from the food. Drying times take in the order of perhaps 6–10 hours depending on the size of food pieces, their tissue nature, the hydrating salt, the atmospheric pressure, and the like.

Upon complete ice sublimiation from the food product, the chamber atmosphere is increased to ambient pressure, and the product is removed for further processing, i.e., compression and subsequent complete drying, or packaging.

The salt, now largely in the higher hydrated state, is processed to regenerate the lower hydrate. This operation can be quite conventional, generally comprising subjecting the higher hydrate to a controlled vacuum drying to drive off one or more molecules of water from the salt. The regenerated lower hydrate is then recovered for recycling in the freeze drying chamber.

To illustrate the limited freeze drying process of the present invention; samples of frozen beef and turkey (desired limited freeze dried moisture level — about 11%) were processed in a layered-bed, circulating-gas vacuum chamber utilizing calcium chloride-hydrate as the hydrating drying salt. The conditions of the freeze drying run and the results thereof are set forth in the Example below:

EXAMPLE

| | |
|---|---|
| Circulating Gas: | Air |
| Pressure: | 30 mm Hg abs |
| Gas Velocity: | 90ft/sec |
| Food Loading: | 1.0lb/ft$^2$ |
| Hydrating Salt, start: | $CaCl_2 \cdot H_2O$ |
| finish: | $CaCl_2 \cdot 5.7H_2O$ (average) |
| Drying Time: | 8.5 hours |
| Piece Sizes: | 1-cm cubes |

| Final Moisture Content (Dry Basis) | Turkey | Beef |
|---|---|---|
| A. Piece-to-Piece Variation: | 11.2% | 11.3% |
| | 11.2% | 9.1% |
| | 11.8% | 8.2% |
| | 10.7% | 9.4% |
| | 10.1% | 9.3% |
| B. Comparison of Moisture Content of Outer Layers with that of the Center of the Same Piece: | | |
| Piece No. 1 — Outer Layers | 9.8% | 8.7% |
| Center Core | 11.4% | 10.6% |
| Piece No. 2 — Outer Layers | 10.4% | 10.2% |
| Center Core | 11.6% | 14.4% |
| Shrinkage upon Freeze-Drying: (Loss of volume during freeze drying/frozen volume) | | |
| Piece A | 0.19 | 0.13 |
| Piece B | 0.14 | 0.23 |
| Rehydration Characteristics: (Weight after reconstituting in water at ambient temperature for 20 min. and then blotting, divided by weight before freeze-drying) | | |
| Piece A | 1.06 | 0.90 |
| Piece B | 1.12 | 0.93 |
| Compressibility of Product: | Good | Good |

The average moisture content achieved from the above Example was 110% for turkey and 95% for beef, with average deviations for five pieces of 03% and 08% moisture for turkey and beef, respectively. The moisture content from piece to piece was quite uniform; while moisture distribution within a piece fell well within the desired range (8–15%). Shrinkage, rehydration, and compressibility characteristics were all good. These results, and taste tests, lead to the conclusion that product quality of the limited freeze dried turkey and beef was excellent.

What is claimed is:

1. A method for limited freeze drying of foods comprising cooling the food to freeze water contained therein into ice, subliming the ice from the food in an atmosphere at a predetermined relative humidity, stabilizing the relative humidity in said atmosphere during the sublimation of ice from the food by continually contacting the atmosphere with a quantity of a hydrating salt.

2. The method of claim 1 wherein the relative humidity is stabilized by removing water vapor from the atmosphere through contact with a salt that changes from a first lower hydration state to second higher hydration state.

3. A method for limited freeze drying of foods comprising freezing the food and the moisture contained therein, subliming the moisture from said frozen food maintaining the relative humidity in the surrounding atmosphere at a predetermined relative humidity by contacting the atmosphere with a salt in a first lower hydration state and removing at least a portion of the moisture sublimed from the food from atmosphere by said salt undergoing transition to a second higher hydration state, and utilizing heat generated by the hydrating salt for sublimation of the frozen moisture from the food.

4. The method of claim 3 wherein the atmosphere is continually circulated between the frozen food and the hydrating salt.

5. In a method for limited freeze drying of food in which a food product is frozen to change water therein into ice and is subsequently introduced into a reduced pressure atmosphere to sublime the ice from the food product, the improvement comprising maintaining the relative humidity in said atmosphere at a preselected value by continually contacting the atmosphere with a hydrated salt that undergoes a transition from a first lower hydration state to a second higher hydration state during the freeze drying process.

6. the method of claim 5 wherein a further improvement comprises supplying thermal energy generated during the hydration transition of said salt to the frozen food product to furnish energy required to sublime the ice therefrom.

7. The method of claim 6 wherein the water content of said food product is reduced to from about 5 to about 25% by weight at termination of the limited freeze drying.

8. The method of claim 6 wherein the atmosphere is continually circulated between the freeze drying food and the hydrating salt.

9. The method of claim 6 wherein the food and hydrating salt are placed in alternating, adjacent layers and the atmosphere is circulated through the adjacent layers.

* * * * *